(12) United States Patent
Jang

(10) Patent No.: US 8,979,421 B2
(45) Date of Patent: Mar. 17, 2015

(54) MANHOLE COVER AND METHOD FOR MANUFACTURING SAME

(76) Inventor: Jung Sik Jang, Bucheon-si (KR)

( * ) Notice: Subject to any disclaimer, the term of this patent is extended or adjusted under 35 U.S.C. 154(b) by 168 days.

(21) Appl. No.: 13/383,528

(22) PCT Filed: Jul. 13, 2010

(86) PCT No.: PCT/KR2010/004551
§ 371 (c)(1),
(2), (4) Date: Jan. 11, 2012

(87) PCT Pub. No.: WO2011/008011
PCT Pub. Date: Jan. 20, 2011

(65) Prior Publication Data
US 2012/0114414 A1    May 10, 2012

(30) Foreign Application Priority Data
Jul. 13, 2009  (KR) .................. 10-2009-0063668

(51) Int. Cl.
*E02D 29/14* (2006.01)
*B28B 23/02* (2006.01)
*B29C 67/24* (2006.01)

(52) U.S. Cl.
CPC ............. *E02D 29/14* (2013.01); *B28B 23/02* (2013.01); *B29C 67/243* (2013.01)
USPC .......................................................... 404/25

(58) Field of Classification Search
USPC ........................... 404/2, 4, 25, 26; 52/19–21
See application file for complete search history.

(56) References Cited

U.S. PATENT DOCUMENTS

| | | | | |
|---|---|---|---|---|
| 2,558,580 | A * | 6/1951 | Pomykala ..................... | 52/20 |
| 3,968,601 | A | 7/1976 | Brown et al. | |
| 4,124,324 | A * | 11/1978 | Augis et al. ................. | 404/3 |
| 4,726,707 | A * | 2/1988 | Newton ...................... | 404/25 |
| 5,271,193 | A * | 12/1993 | Olsen et al. ................. | 52/19 |
| 5,405,218 | A * | 4/1995 | Hyde-Smith ............... | 405/303 |
| 6,023,903 | A * | 2/2000 | Stecker ....................... | 52/846 |
| 7,914,227 | B2 * | 3/2011 | Jordan et al. ................ | 404/25 |
| 2002/0020033 | A1 * | 2/2002 | Lang .......................... | 14/73 |
| 2005/0072056 | A1 | 4/2005 | Famy et al. | |
| 2005/0281999 | A1 * | 12/2005 | Hofmann et al. ........ | 428/304.4 |
| 2009/0290934 | A1 * | 11/2009 | Jordan et al. ............... | 404/26 |

FOREIGN PATENT DOCUMENTS

JP        60-129327       7/1985
KR        10-0325398      8/2001

(Continued)

OTHER PUBLICATIONS

International Search Report for PCT/KR2010/004551 mailed Apr. 26, 2011.

*Primary Examiner* — Abigail A Risic
(74) *Attorney, Agent, or Firm* — Andrus Intellectual Property Law, LLP

(57) ABSTRACT

A manhole cover maintains a strength and weight the same as those of conventional manhole covers made of cast iron, eliminates the risk of theft, and achieves improved corrosion resistance and sealing properties. The manhole cover comprises: a base unit made of composite materials having compositions containing 12 to 18 wt % of glass fiber, 17 to 23 wt % of a polyester resin, with the remainder being calcium carbonate ($CaCO_3$), wherein the base unit is mounted on the manhole such that an upper portion of the base unit is exposed aboveground; and a metal reinforcement unit which is uniformly distributed within the base unit to reinforce the base unit and increase weight and strength of the base unit.

1 Claim, 2 Drawing Sheets

(56) References Cited

FOREIGN PATENT DOCUMENTS

| KR | 20-0403742 | 12/2005 |
| KR | 10-0641311 | 10/2006 |
| KR | 10-0786567 | 12/2007 |
| KR | 10-0804783 | 2/2008 |

* cited by examiner

MANHOLE COVER AND METHOD FOR MANUFACTURING SAME

RELATED APPLICATIONS

This application is a 371 application of International Application No. PCT/KR2010/004551, filed Jul. 13, 2010, which in turn claims priority from Korean Patent Application No. 10-2009-0063668, filed Jul. 13, 2009, each of which is incorporated herein by reference in its entirety.

TECHNICAL FIELD

The present invention relates to a manhole cover and a method for manufacturing the same, and in particular to a manhole cover and a method for manufacturing the same, with the manhole cover having the same strength and weight as compared with a conventional cast iron manhole cover and providing an excellent anticorrosion and sealing performance while effectively preventing the product of a manhole cover from being stolen.

BACKGROUND ART

There is a manhole allowing a worker to enter for the maintenance of various city infrastructural facilities such as a drain system, water work facilities, a communication facility, an electric power facilities, etc.

The manhole generally represents a lower body which is installed under the ground, thus communicating the underground space and the ground space. A manhole cover exposed to the ground is mounted at an upper side of the manhole. The manhole cover basically serves to prevent various foreign substances and pedestrians from falling and prevent the bad smell from spreading from the underground space to the ground space by sealing the manhole.

The conventional manhole cover is generally made from a steel casting of a carbon cast steel. The manhole cover made from such materials is heavy, which brings in hard installation and maintenance.

Since the manhole cover made from a cast material is made with a single material, it is easy to recycle the product of the manhole cover to manufacture another product by melting the manhole cover. With its easy recycling to another product, the manhole cover installed on the road or the ground is frequently stolen.

The installation of a certain device for preventing the manhole from being stolen additionally costs a lot. If the manhole is stolen, a big open hole is formed, so a vehicle or a pedestrian might fall though the big open hole. Since the steel cast has a good electrical conductivity, an electric shock accident might occurs in the rain.

A new manhole cover made from a plastic material is developed in an attempt to prevent the above problems of the manhole cover made from a steel cast material; however such new product is too fragile and light as compared to the conventional steel cast product. If a lot of rainwater flows at a time over the manhole cover, the manhole cover might easily escape the installed site.

In order to overcome the problems belonging to a plastic material manhole cover, another new manhole cover is developed, which is made from a plastic-combined steel material; however such manhole cover somehow overcomes the strength and weight problems, but since the steel portions are exposed to the ground, an electric shock problem still remains unsolved.

DISCLOSURE OF INVENTION

Accordingly, it is an object of the present invention to provide a manhole cover and a method for manufacturing the same which overcome the problems encountered in the conventional art, the product of a manhole cover made from a composite material (also referred to herein as a combined material) which is not able to recycled even the manhole cover is melted once it is manufactured, thus preventing the manhole cover from being stolen.

It is another object of the present invention to provide a manhole cover and a method for manufacturing the same which provide a manhole cover with a stable strength, and the manhole cover is not easily escaped from a manhole in such a way that the manhole cover has a reinforcing material in the interior of the same so as to maintain almost same strength and weight as a conventional manhole cover made from a cast steel.

It is further another object of the present invention to provide a manhole cover and a method for manufacturing the same which make it possible to enhance both a free design choice range of a manhole cover exposed to the ground and a visibility with the aid of various colors.

It is still further another object of the present invention to provide a manhole cover and a method for manufacturing the same which can prevent the spread of a toxic gas and a bad smell by enhancing a sealing performance with the manhole.

It is still further another object of the present invention to provide a manhole cover and a method for manufacturing the same which provide a long life span of a product by improving both an anticorrosion performance and an endothermic performance, thus significantly lowering a manufacture cost as compared with a conventional manhole cover made from a cast steel.

To achieve the above objects, there is provided a manhole cover, comprising:

a base part which is made from a combined material having compositions of 12~18 weight % of a glass fiber, 17~23 weight % of a polyester resin and $CaCO_3$ filled in the remaining parts and is mounted in a manhole, with the upper side of the base part being exposed to the ground; and a metallic reinforcing part which is uniformly filled in the interior so as to reinforce the base part and increase the weight and strength.

The base part contains 0.7~1.3 weight % of a UV blocking agent so as to block ultraviolet ray and enhance sterilization performance.

The base part is formed in a circular dish shape.

The reinforcing parts are arranged in a radial shape so that a plurality of intermediate portions each having a length smaller than the diameter of the base part come into outer contact with an imaginary circle, with their end portions being engaged on the same plane and in an upper upon lower stacked structure with the end portion being formed at an acute angle with respect to the end portions of other wires.

The base part is formed in a quadrangle shape.

The reinforcing part is formed in a shape having a mesh with the uniform size as a plurality of wires corresponding to the size of the base part are crossed with each other.

The base part is formed in a quadrangle shape having a through hole of a rectangular shape, a square shape or a circular shape, and the reinforcing part is arranged along an edge portion of the base part while passing through the through holes.

To achieve the above objects, there is provided:

a step for first, half injecting into a mold a combined material;

a step for mounting a reinforcing part on the injected combined material;

a step for second, injecting the combined material having the above compositions over the reinforcing part, thus filling a mold; and a step for compressing and heat treating the combined material by applying a pressure to the mold.

The combined material has compositions of 12~18 weight % of a glass fiber, 17~23 weight % of a polyester resin, 0.7~1.3 weight % of a UV blocking agent and $CaCO_3$ filled in the remaining parts;

The reinforcing part is manufactured by a process comprising:

a step for preparing a wire of a steel pipe type or a solid steel rod type;

a step for forming a reinforcing unit in such a way that the intermediate portions of the wires are arranged in a radial shape, coming into outer contact with an imaginary shape, with their end portions being welded at an acute angle on the same plane with the end portions of other wires; and a step for re-engaging the reinforcing units in an upper upon lower stacked structure.

The heat treatment of the combined material is performed within a range of 180~220° C.

ADVANTAGEOUS EFFECTS

According to the present invention, since a manhole cover is made from a combined material the recycling of which is impossible, there is not a chance of being stolen as compared to a conventional manhole cover made from a cast steel, so it is possible to prevent a vehicle or a pedestrian from falling into a manhole.

According to the present invention, the manufacture cost of a manhole cover can be saved a lot while maintaining a strength and a weight as compared to a conventional manhole cover made from a cast steel.

The manhole cover according to the present invention is made from a combined material the outer side of which can be easily formed, so a desired pattern can be easily printed or formed on its outer surface, and a free design choice range is wide, and various colors can be applied, thus enhancing a visibility.

The manhole cover according to the present invention has an excellent sealing performance for a manhole as compared to a conventional manhole cover made from a cast steel, and it is possible to prevent a toxic gas or a bad smell from spreading through a gap between a manhole and a manhole cover.

The manhole cover according to the present invention is very strong to corrosion and heat, so the product has a long service life. When it is installed on a road, an excellent impact absorption performance is achieved, which leads to a lot of noise reduction as a vehicle runs on a road.

The manhole cover according to the present invention is made from a combined material of plastics having a low electric conductivity, an electric shock due to leakage of electric power can be substantially prevented.

BRIEF DESCRIPTION OF THE DRAWINGS

The present invention will become better understood with reference to the accompanying drawings which are given only by way of illustration and thus are not limitative of the present invention, wherein.

Figure 1:
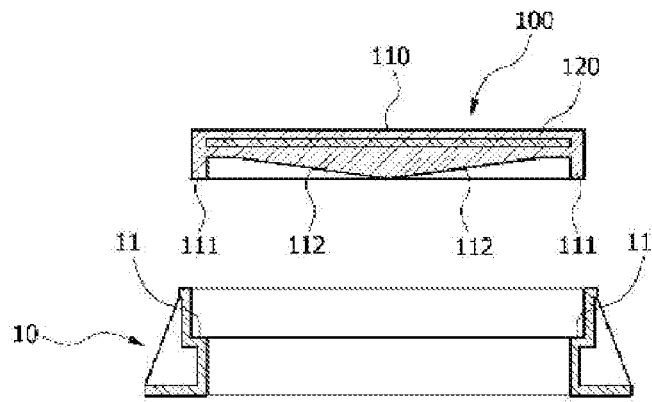
FIG. 1 is a side cross sectional view illustrating a construction of a manhole cover according to the present invention.

<Descriptions of reference numerals of the drawing>

| | |
|---|---|
| 100: manhole cover | 110: base part |
| 111: mounting part | 112: inclined surface |
| 113: through hole | 120: reinforcing part |
| 121: wire | |

BEST MODES FOR CARRYING OUT THE INVENTION

The preferred embodiments of the present invention will be described with reference to the accompanying drawings.

Figure 2:
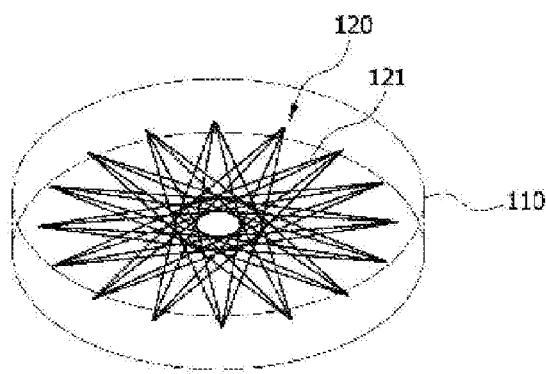
FIG. 2 is a perspective view illustrating a manhole cover according to a primary embodiment of the present invention.
Figure 3:
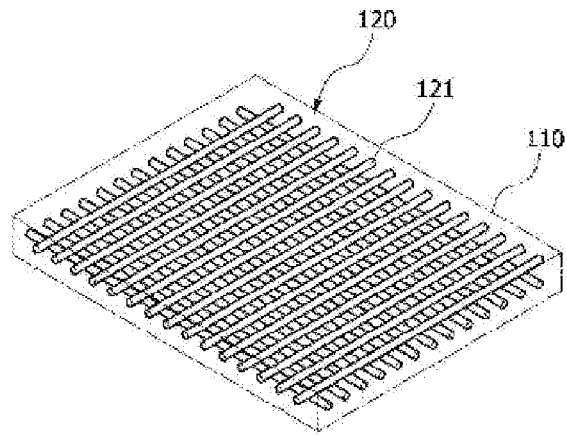
FIG. 3 is a perspective view illustrating a manhole cover according to another embodiment of the present invention.
Figure 4:
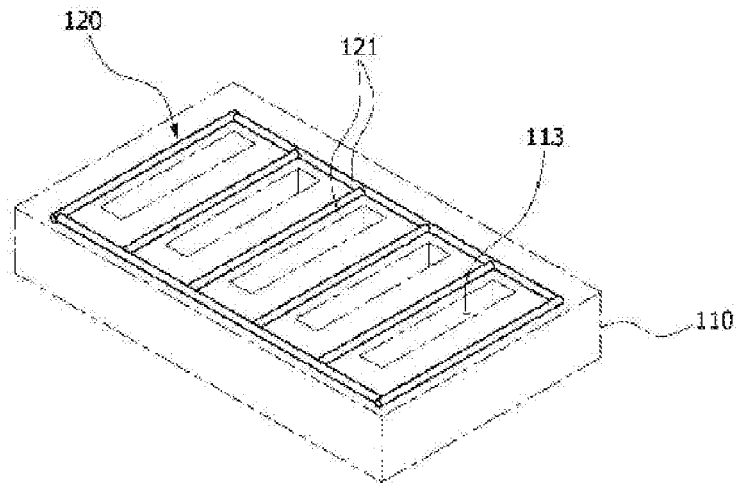
FIG. 4 is a perspective view illustrating a construction according to further another embodiment of the present invention.
Figure 5:
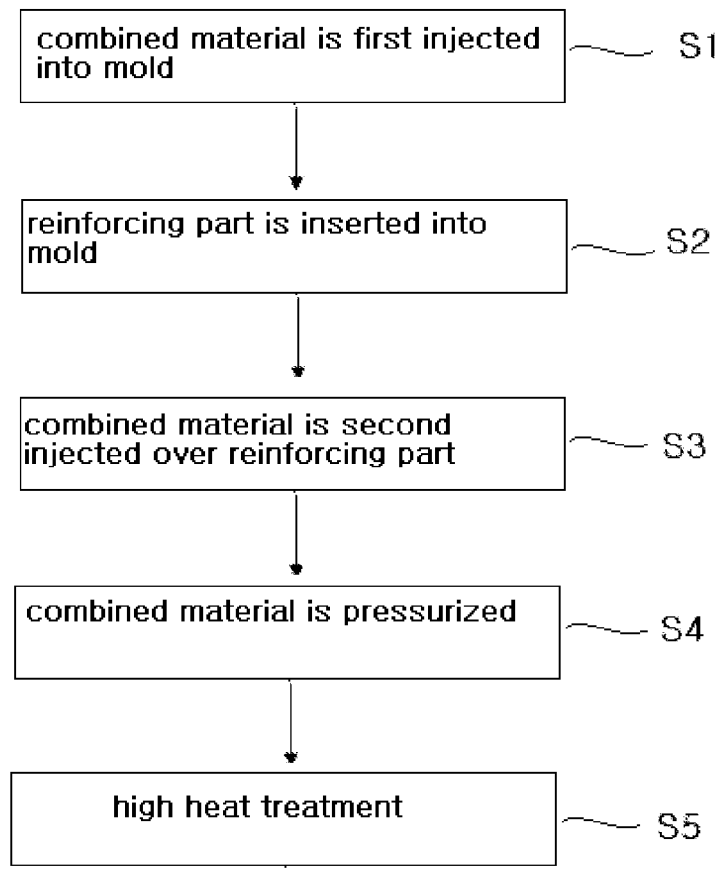
FIG. 5 is a block diagram of a manufacture process according to the present invention.

FIG. 1 is a side cross sectional view illustrating a construction of a manhole cover according to the present invention, FIG. 2 is a perspective view illustrating a manhole cover according to a primary embodiment of the present invention, FIG. 3 is a perspective view illustrating a manhole cover according to another embodiment of the present invention, FIG. 4 is a perspective view illustrating a construction according to further another embodiment of the present invention, and FIG. 5 is a block diagram of a manufacture process according to the present invention.

The present invention is basically directed to providing a manhole cover 100 and a method for manufacturing a manhole cover 100.

First of all, the construction of the manhole cover 100 according to the present invention will be described.

As shown in FIG. 1, the manhole cover 100 according to the present invention comprises a base part 110 and a reinforcing part 120. The base part 110 defines the whole outer construction of the manhole cover 100, and the base part 110 is substantially mounted in the manhole 10, thus sealing the manhole 10. When the manhole 10 is sealed, the upper side of the base part 110 is substantially exposed to the ground, thus preventing a vehicle or a pedestrian from falling into the manhole 10.

The base part 110 is made from a combined material which can be easily manufactured. The combined material is formed of 12~18 weight % of glass fiber, and 17~23 weight % of polyester resin, and the remaining part is formed of $CaCO_3$.

Since the base part 110 is made from an electrically nonconductive combined material, the electric shock can be substantially prevented even when electric power is leaked, and various patterns such as characters, logos, etc. might be printed on its outer surface with different colors, so a free design choice range is very wide.

In terms of the composition of the base part 110, the glass fiber can stand a temperature higher than 200° C. and has the same performance at event −50° C. The glass fiber also has an excellent heat resistance performance as well as an excellent chemical durability, thus obtaining a reliable anticorrosion performance.

The glass fiver serves to improve the whole strength by reinforcing the general performance of the combined material, so the strength of the manhole cover 100 can be maintained, and the manhole cover can stand heat and moisture.

It is most preferred that the glass fiber is contained by 12~18 weight %. When the glass fiber is contained less than 12 weight %, the strength and weight decrease as compared with the conventional manhole cover made from a cast steel. When the glass fiber is contained more than 18 weight %, the manufacture cost disadvantageously increases.

The polyester resin is a thermosetting setting resin, namely unsaturated resin, which is solidified by a chemical reaction as it is combined with a hardener.

It is preferred that the polyester resin is contained 17~23 weight %. When the polyester resin is contained less than 17 weight %, the strength and weight of the base part 110 decrease like the glass fiber. When it is contained in excess of 23 weight %, the manufacture costs a lot, so it is not recommended.

The glass fiber and the polyester resin are first combined within the above composition range, and then the remaining parts are filled by carbon calcium, thus forming 100 weight % in total.

The carbon calcium serves to play a function of a filler which fills the remaining weight % in terms of the base part 110. If other components are added other than the glass fiber and the polyester resin, the composition of the carbon calcium decreases by as much as the above weight %.

The base part 110 might further contain a UV blocking agent other than the glass fiber, the polyester resin and the carbon calcium. The UV blocking agent serve to block ultraviolet ray and has a strong sterilizing ability like inhibiting the growth of various bacteria and virus.

It is preferred that the UV blocking agent is contained 0.7~1.3 weight %. When the UV agent is contained 0.7~1.3 weight %, the carbon calcium is reduced as much as the weight % corresponding to the added UV blocking agent.

The following is a result of the strength measurement with respect to a composition change by each component the result of which is obtained through the following experiments, provided that the UV blocking agent is set as 1 weight %.

and 17~23 weight % of polyester resin. Here, when the composition ratios of the glass fiber and the polyester resin increase, the strength increases in proportion thereto; however since the manufacture cost increases a lot, a preferred range satisfying both the strength and manufacture cost is less than 18 weight % of glass fiber, and less than 23 weight % of polyester resin.

For reference, the manhole cover (for example, the manhole cover A) of the same kinds in the above experiments has changed the composition of each component while using the reinforcing parts with the same diameters, and the different kinds of the manhole covers (for example, the manhole covers A, B, C and D) have the reinforcing parts inserted into the interior and having different diameters so as to satisfy the required strengths, so the differences occur even in case of the same components.

The base part 110 containing the above compositions is mounted in the manhole 10 and blocks the manhole 10. The outer diameter of the base part 110 is the same as the inner diameter of the manhole 10 or is smaller a little than the same. A mounting part 111 is formed at a lower outer edge portion of the base part 110 to be caught by an engaging shoulder 11 formed in the interior of the manhole 10.

The upper side of the base part 110 is exposed to the ground as it is mounted in the manhole 10, with a slippery prevention protrusion being formed at an upper surface of the base part 110.

The lower surface of the base part 110 is preferably formed of a flat surface; however there is an inclined surface 112 which is gradual in a direction from the central portion of the base part 110 to the edge portion, so the thickness in the direction of the mounting part 111 is smaller than that of the central portion.

As shown in FIG. 2, the base part 110 might be formed in a circular dish shape or a hole is formed at the base part or a hole is not formed thereat. As shown in FIG. 3, it might be formed in a quadrangle shape. In the event that the present invention is applied as a drain cover, as shown in FIG. 4, it is preferred that the base part 110 is formed in a quadrangle

TABLE 1

| kinds of manhole covers | required strength ($kN/cm^2$) | glass fiber (weight %) | polyester (weight %) | UV blocking agent (weight %) | carbon calcium (weight %) | strength ($kN/cm^2$) |
|---|---|---|---|---|---|---|
| A(for drain purpose) | 30 | 10 | 15 | 1 | 74 | 27 |
|  |  | 12 | 17 | 1 | 70 | 32 |
|  |  | 15 | 20 | 1 | 64 | 40 |
|  |  | 18 | 23 | 1 | 58 | 43 |
|  |  | 20 | 25 | 1 | 54 | 45 |
| B(for sewage disposal tank purpose) | 125 | 10 | 15 | 1 | 74 | 120 |
|  |  | 12 | 17 | 1 | 70 | 140 |
|  |  | 15 | 20 | 1 | 64 | 147 |
|  |  | 18 | 23 | 1 | 58 | 153 |
|  |  | 20 | 25 | 1 | 54 | 157 |
| C(for sidewalk purpose) | 250 | 10 | 15 | 1 | 74 | 239 |
|  |  | 12 | 17 | 1 | 70 | 267 |
|  |  | 15 | 20 | 1 | 64 | 285 |
|  |  | 18 | 23 | 1 | 58 | 299 |
|  |  | 20 | 25 | 1 | 54 | 314 |
| D(for road purpose) | 400 | 10 | 15 | 1 | 74 | 385 |
|  |  | 12 | 17 | 1 | 70 | 426 |
|  |  | 15 | 20 | 1 | 64 | 443 |
|  |  | 18 | 23 | 1 | 58 | 461 |
|  |  | 20 | 25 | 1 | 54 | 480 |

As seen from the above table 1, the composition ratios of the fixed strength required in the manhole cover by each use purpose are as described above 12~18 weight % of glass fiber, shape with a through hole 113. The shape of the base part 110 might be preferably selected depending on where it will be used or a users decision.

The reinforcing part 120 is made from a metallic material which is uniformly accommodated in the interior of the base part 110 in order to reinforce the base part 110 made from a combined material and increase the weight and strength of the manhole cover 100.

The reinforcing part 120 might be implemented in a different type depending on the shape of the base part 110. As shown in FIG. 2, if the base part 110 is formed in a circular dish shape, the reinforcing part 120 might be implemented in a radial shape.

As shown in FIG. 2, the reinforcing part 120 will be described in more detail. The reinforcing part 120 is arranged in such a manner that the intermediate portions of the plurality of the wires 121 each having a length smaller than the diameter of the base part 110 are arranged in a radial shape while coming into outer contact with an imaginary circle, with its end being formed at an acute angle with respect to the ends of other wires 121 and being stacked on the same plane in a layer upon layer form.

The wire 121 might be formed of a hollow steel pipe or a solid steel rod, and the length of the wire 121 should be smaller than the diameter of the base part 110 to be internally disposed in the base part 110.

The intermediate portions of the plurality of the wires 121 are arranged in a radial shape while coming into outer contact with an imaginary circle. Here, the ends of the wires 121 meet with the ends of other some wires 121, and the ends of the wires 121 are welded with each other or engaged in a certain known way in such a way that they have acute angles smaller than 90° and have stacked on the same plane in a layer upon layer form. The detailed method for manufacturing the reinforcing part 120 will be described later.

The reinforcing part 120 is constructed in a 3D dimensional structure as a plurality of wires 121 are engaged with each other in a geographical shape. With the reinforcing 120 being accommodated in the base part 110, even when force is concentrated at the base part 110, the weight is uniformly distributed over the entire portions of the base part 110 with the aid of the reinforcing part 120, so the service life of the base part 110 can be elongated, while maintaining the same strength as the conventional manhole cover made from a cast steel.

The reinforcing part 120 is made from a metal; however it is not exposed to the ground by means of the base part 110, which consequently prevents robbery since it is very hard to separate from the base part 110. The robbery frequently occurs for recycling.

As shown in FIG. 3, in the event that the base part 110 is formed in a quadrangle shape, the reinforcing part 120 might preferably formed in a sieve shape. Here, the base part 110 might be formed in a square shape or a rectangular shape, if necessary.

In the event that the base part 110 is formed in a quadrangle shape, the reinforcing part 120 might be formed in a sieve shape with a plurality of uniform mesh as a plurality of wires 121 are crossed from each other.

The size of each mesh of the reinforcing part 120 can be properly adjusted. As the size of the mesh size increases, the number of the wires 121 decreases, so the strength and weight of the base part 110 decreases. So, the size of the mesh is properly adjusted.

Here each outer most wire 121 belonging to the reinforcing part 120 is preferably spaced apart having the same distances with each edge portion of the base part 110. As they are arranged with the same distances from the edge portions of the base part 110, the wires 121 are not concentrated at one side, thus uniformly distributing the entire weights and loads.

Each portion where a plurality of wires cross with each other is engaged by means of a welding method, thus obtaining an efficient distribution.

As shown in FIG. 4, the base part 110 might be used for the purpose of a drain cover. In the event that the base part 110 is used for the purpose of a drain cover, there are provided a plurality of through holes 113 at the base part 110 for allowing water to pass through the same. The base part 110 is formed in a quadrangle shape with the through holes 113.

It is appreciated that the base part 110 is formed in a quadrangle shape including a square shape or a rectangular shape. In the event that a plurality of though holes 113 are formed at the base part 110, the through holes 113 might be formed in a rectangular shape, a square shape or a circular shape. The shape of the reinforcing part 120 might change depending on the shape of the base part 110.

FIG. 4 is a view illustrating a construction that the base part 110 is formed in a square shape, and the through holes 113 are formed in a rectangular shape. Here, the wires 121 of the reinforcing part 120 are arranged along an edge portion of the base part 110, while passing through the through holes 113. FIG. 4 is a view of an example depending on only the shape of the base part 110. It is obvious for the person skilled in the art to easily change the structure or type of the reinforcing part 120 when the person understands the technical principle of the present invention. It is obvious that the technologies not described in the descriptions as well as the technologies derived from the same reside in the scope of the right of the present invention.

The method for manufacturing the manhole cover 100 according to the present invention will be described with reference to FIG. 5.

The manhole cover 100 as described above is generally manufactured through the following processes.

A mold with a certain size and a certain shape is prepared. A combined material containing a certain component is first, half injected into the mold (S1).

The reinforcing part 120 is mounted over the first injected combined material (S2), and the combined material is second injected into the reinforcing part 120, thus fully filling the mold (S3).

When the reinforcing part 120 is mounted in a proper place in the interior of the combined material, a pressure is supplied to the mold by using a hydraulic machine, so the combined material is compressed to have a certain strength (S4), and is heat treated at a high temperature (S5).

The combined material is hardened through the steps S1 through S5 and becomes a base part 110, thus manufacturing a manhole cover with the reinforcing part 120 being inserted into the interior of the base part 110.

The combined material is formed of 12~18 weight % of glass fiber, 17~23 weight % of polyester resin, and 0.7~1.3 weight % of UV blocking agent, with $CaCO_3$ being filled in the remaining parts.

Since the characteristics of each component and their critical meanings are described earlier, so their detailed descriptions will be omitted.

The reinforcing part 120 is manufactured through the following steps. First of all, a plurality of wires 121 of a steel pipe type or a solid steel rod shape are prepared. The wires 121 are sequentially arranged in a radial shape with their intermediate portions coming into outer contact with an imaginary circle, thus manufacturing one reinforcing unit in such a way to weld so that the end portions of the wires are welded on the same plane at an acute angle with the ends of other wires.

The reinforcing unit is formed in a star shape on the same plane. The reinforcing unit might be directly inserted into the combined material; however the reinforcing units are engaged in a layer upon layer stacked structure for an uniform weight distribution, thus preferably forming a 3D structure.

The reinforcing unit might be formed in a two-story structure with upper and lower layers. If necessary, it might be formed in a three-story structure or a more-story structure. The structure might be selected by an implementer.

As the reinforcing units are stacked in a layer upon layer structure, the concentrated force applied to the manhole cover 100 is uniformly applied over the plane and in a vertical direction, so the weight can be consequentially applied to the whole portions of the manhole cover 100. So, the manhole cover can stand the concentrated weight as well as the repeated weight application along with an excellent durability, which results in elongating service life.

The combined material is heat treated at a high temperature at the last step, which is directed to maintaining a higher strength by heating the glass fiber and the thermosetting polyester resin. It is preferred that the teat treatment of the combined material is performed in a range of 180~220° C. If the heat treatment temperate is less than 180° C., the solidification of the combined material occurs less, and if the heat treatment temperature is in excess of 220° C., an overheating problem occurs, which might bring in a worse result.

The preferred embodiment of the present invention has been described in the above. The scope of the present invention is not limited to a specific embodiment, and the person skilled in the art can easily change or modify the elements within the scope of the present invention, and it is obvious that the changed or modified elements belong to the scope of the present invention.

The invention claimed is:

1. A manhole cover, comprising:

a base made of a composite material having 12-18 weight % of a glass fiber, 17-23 weight % of a polyester resin and a remaining weight % of $CaCO_3$, the base being mounted in a manhole and having an exposed top; and a metallic reinforcing member which is uniformly filled in the interior so as to reinforce the base and increase the weight and strength, wherein said base contains 0.7~1.3 weight % of a UV blocking agent to block ultraviolet rays and enhance sterilization, wherein the reinforcing member includes first to fourth elongate wires, all converging into a first point at an outer circumference of the base, the first wire extending from the first point to a second point at a first inner central circle around a central point of the base, the second wire extending from the first point to a third point at the first inner central circle, the third point being opposite to the second point, the third wire extending from the first point to a fourth point at a second inner central circle around the central point of the base, the fourth wire extending from the first point to a fifth point at the second inner central circle, the fourth point being opposite to the fifth point, the first circle having a diameter larger than a diameter of the second circle, and wherein the base has a thickness to taper in a radial direction from a central region thereof toward a circumference region thereof.

* * * * *